(12) United States Patent
Cox

(10) Patent No.: US 6,339,891 B1
(45) Date of Patent: Jan. 22, 2002

(54) METAL PICTURE FRAME

(75) Inventor: Eugene Cox, Midlothian, VA (US)

(73) Assignee: Nielsen & Bainbridge L.L.C., Paramus, NJ (US)

( * ) Notice: Subject to any disclaimer, the term of this patent is extended or adjusted under 35 U.S.C. 154(b) by 0 days.

(21) Appl. No.: 09/450,979

(22) Filed: Nov. 30, 1999

Related U.S. Application Data

(60) Provisional application No. 60/148,970, filed on Aug. 13, 1999.

(51) Int. Cl.[7] ................................................ A47G 1/10
(52) U.S. Cl. ........................ 40/785; 403/401; 403/294; 40/782
(58) Field of Search .................. 40/785, 782; 403/402, 403/401, 403, 295, 297, 231, 294

(56) References Cited

U.S. PATENT DOCUMENTS

| | | |
|---|---|---|
| 2,581,843 A | 1/1952 | Edwards |
| 2,654,451 A | 10/1953 | Schmidgall |
| 3,534,490 A | 10/1970 | Herbert |
| 3,698,114 A | 10/1972 | Hirsch et al. |
| 4,122,617 A | 10/1978 | Nielsen |
| 4,377,915 A | 3/1983 | Zossimas et al. |
| 4,516,341 A | 5/1985 | Jenkins |
| 4,538,936 A | 9/1985 | Zeidl |
| 4,714,373 A | 12/1987 | Heekin |
| 4,718,184 A | 1/1988 | Sherman |
| 4,825,529 A | 5/1989 | Sawada et al. |
| 5,050,324 A | 9/1991 | Casull |
| 5,384,978 A | 1/1995 | Peters |
| 5,799,430 A | 9/1998 | Fremstad |
| 6,138,741 A | 10/2000 | Stobart |

*Primary Examiner*—B. Dayoan
*Assistant Examiner*—William L. Miller
(74) *Attorney, Agent, or Firm*—Darby & Darby

(57) ABSTRACT

A picture frame comprises mitred metallic frame sections, each of which has a locking channel and a rearwardly facing opening, and a corner piece in each corner of the frame to lock adjacent frame sections together. Each corner piece comprises an L-shaped locking plate and an L-shaped backing plate, with the legs of each plate extending into the locking channels of adjacent frame section. In one embodiment, each locking plate has a single threaded aperture at the junction of the two legs which form the L and a screw extending through the aperture into engagement with the associated backing plate. The screw is accessible through the rearwardly facing opening of adjacent frame sections at their mitred junction. In a second embodiment, a cam positioned at the junction of the legs of the two plates is rotated to force the plates apart.

16 Claims, 2 Drawing Sheets

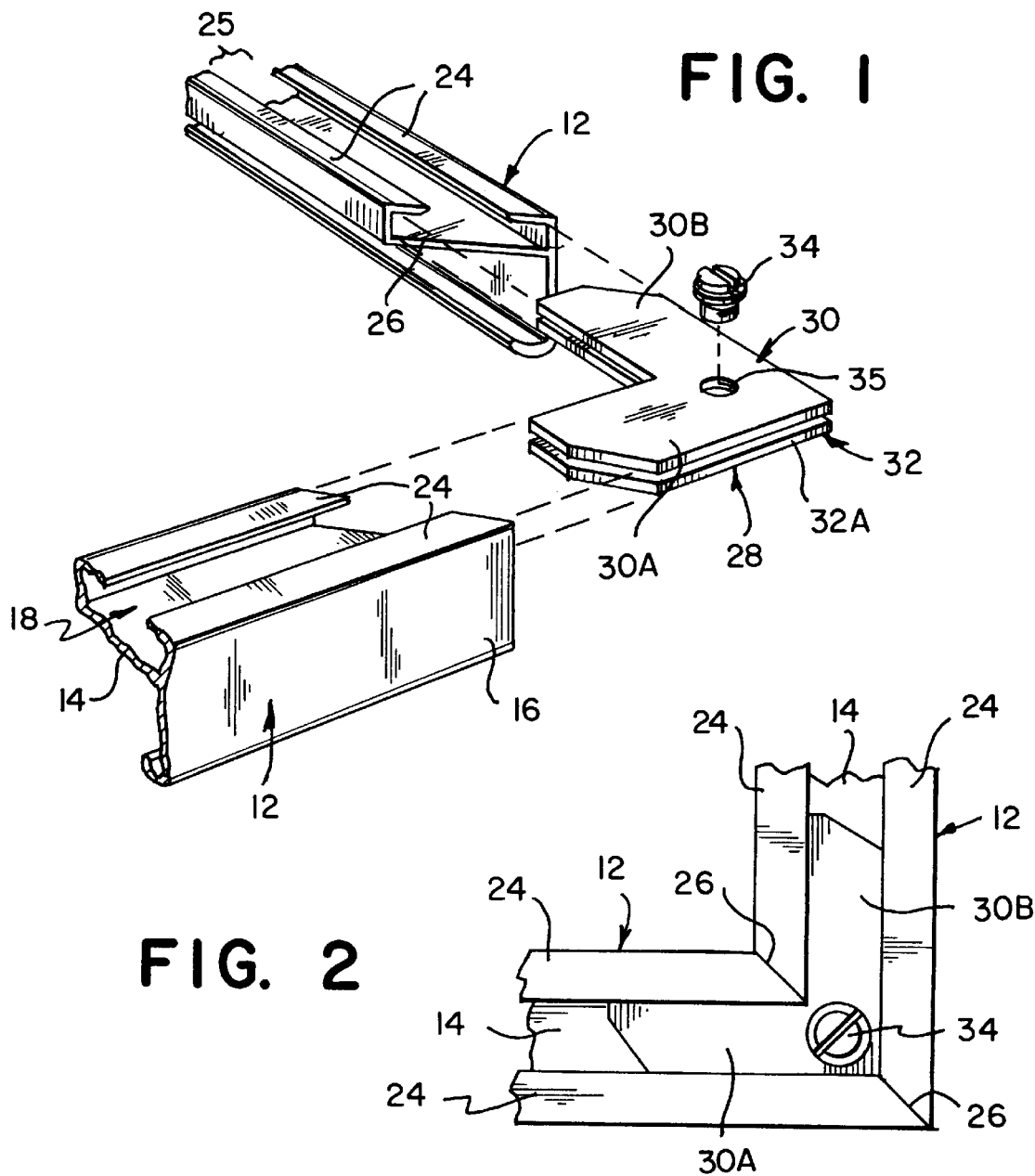
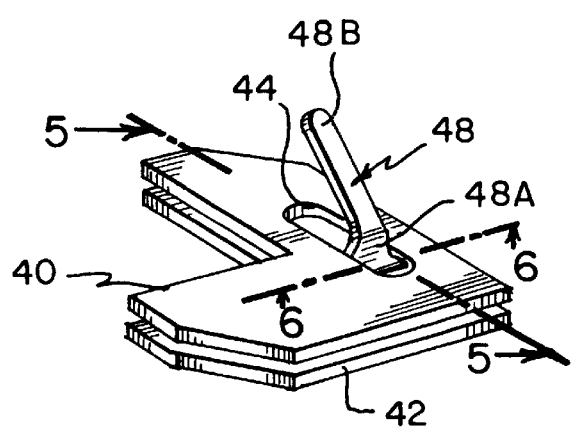
FIG. 1
FIG. 2
FIG. 3

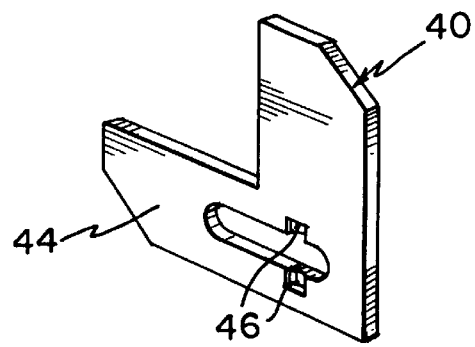
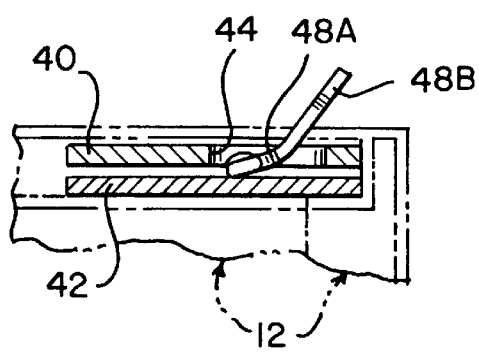
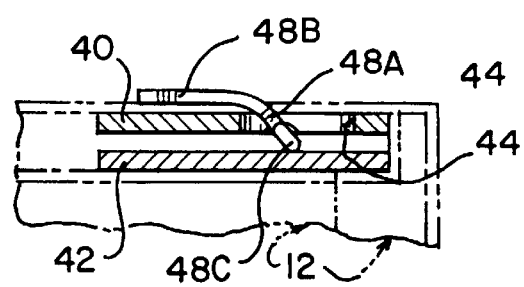
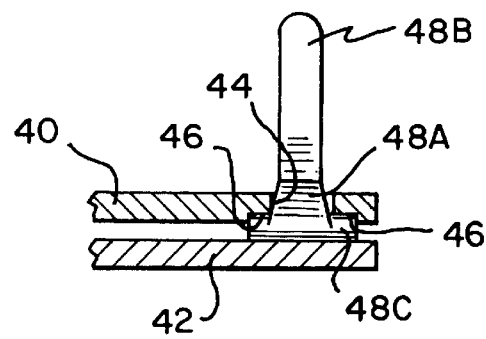
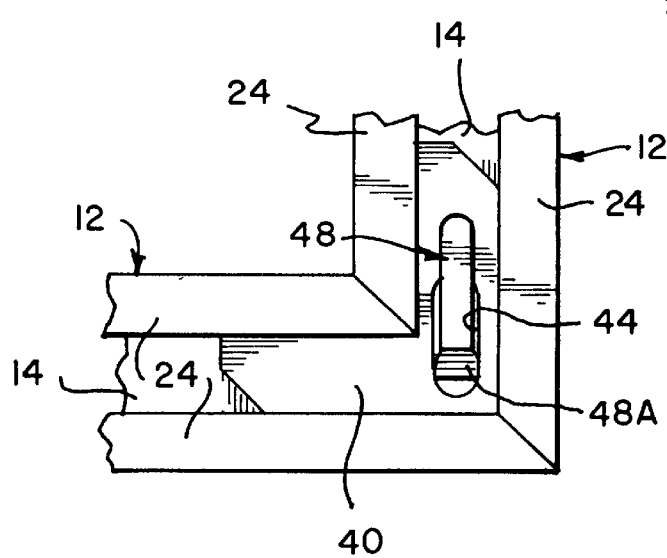

METAL PICTURE FRAME

This application claims priority pursuant to 35 U.S.C. 119 based upon U.S. Provisional Patent Application Ser. No. 60/148,970 filed Aug. 13, 1999, the entire disclosure of which is hereby incorporated by reference.

This invention relates to metal picture frames. More particularly, this invention relates to a picture frame of the type comprising extruded aluminum frame sections which are mitred and locked together by means of L-shaped, double plated corner pieces.

BACKGROUND OF THE INVENTION

A picture frame in common use today is made of extruded aluminum frame sections, each of which includes a locking channel into which the legs of an L-shaped corner piece can be inserted. The corner piece includes two similarly shaped plates which are sometimes referred to as a tapped (threaded) upper plate and a backing plate. The tapped plate includes a threaded opening in each leg for receiving a screw which is accessible through an elongated slot in the back of a frame section. By tightening the screws the tapped plate and backing plate are forced apart thereby clamping the plates against opposing surfaces of the locking channels of two adjacent frame sections to lock the two frame sections together. The backing plate may be unconnected to the tapped plate, or the plates may be held together by means of an elastomeric adhesive applied at the junction of the legs which form the "L". The tapped plate is also known as a locking plate.

When a framer assembles a frame. the two screws in the corner piece are tightened successively. Very often, after the first screw has been tightened with the frame sections carefully aligned, tightening of the second screw will result in slight movement of one frame section relative to the other. When this happens, it is necessary to release the lock and then retighten the screws, hopefully without again losing the alignment.

The object of this invention is to provide a corner piece of the type described in which the likelihood of misaligning the frame sections during attachment of the corner piece is substantially reduced.

In addition to the time saved by eliminating the need to readjust the frame sections by enabling the frame corners to be tightened in a single step, the time required to assemble a frame is reduced. This is a substantial benefit to large volume framers.

SUMMARY OF THE INVENTION

A picture frame comprises mitred metal frame sections joined together at each corner by a double plated corner piece. The corner piece includes an L-shaped locking plate, a backing plate, and a single member which engages with the locking plate and is adapted to bear against the backing plate. The single member is preferably positioned at the junction of the two legs of the respective plates and is accessible through an opening in the back of the frame sections at their mitred junction. The single member may comprise a screw or cam, both of which function to separate the two plates thereby locking the adjacent frame sections together.

THE DRAWINGS

FIG. 1 is a exploded perspective view showing a corner piece in accordance with a first embodiment of the invention in combination with two mitred frame sections, and FIG. 2 is a top plan view showing the corner piece of FIG. 1 in position in an assembled frame.

FIG. 3 is a top perspective view of a corner piece in accordance with a second embodiment of the invention;

FIG. 4 is a perspective view showing the undersurface of the locking plate in accordance with the second embodiment of the invention;

FIG. 5A is a sectional view along the line 5—5 of FIG. 3 showing the corner piece in the unlocked position;

FIG. 5B is a sectional view along the line 5—5 of FIG. 3 showing the corner piece in the locked position;

FIG. 6 is a sectional view along the line 6—6 of FIG. 3; and

FIG. 7 is a top plan view showing a corner piece in accordance with the second embodiment of the invention positioned at the mitred junction of two frame sections.

DETAILED DESCRIPTION

FIGS. 1 and 2 illustrate a picture frame of the type with which the invention is intended to be used. Obviously, frame sections other than the one illustrated can be used with the invention.

The illustrated picture frame comprises four frame sections 12, two of which are shown. Each frame section 12 is preferably extruded from aluminum and, as shown, includes an inwardly directed supporting flange 14, an outer wall 16, and a rearwardly opening locking channel 18. The locking channel 18 is rectangular in cross section and includes two opposed lips 24 which are spaced apart to define an opening 25 extending the length of each section.

The ends of each section are mitred as illustrated at 26. Adjacent frame sections are joined together at their mitred ends and secured in place by a corner piece 28. The corner piece 28 includes an L-shaped tapped plate 30 comprising legs 30A and 30B and an L-shaped backing plate 32. The plates 30 and 32 may be unattached or they may be attached by an elastomeric adhesive.

The art work, which may include mat boards and glass, is retained within the frame between the supporting flange 14 and the curved forward surface of wall 16. This basic construction is disclosed in U.S. Pat. No. 4,122,617 of Nielsen which is hereby incorporated by reference into this application.

In the prior art, the tapped plate 30 includes a threaded aperture in each leg 30A and 30B for receiving a screw. The ends of the two screws contact the backing plate 32 so that when the screws are threaded into the corner piece, the backing plate 32 is pushed away from the tapped plate 30, causing the plates to engage opposing surfaces of the locking channel 18 to lock adjacent frame sections together. Because a framer would tighten the two screws successively, on occasion tightening of the first screw would cause a loss of alignment of the frame sections requiring the framer to repeat the process.

In accordance with the invention, this problem of potential misalignment is avoided by using only a single screw 34 which extends through a threaded aperture 35 in the tapped plate 30. The screw (and threaded aperture) are positioned at the junction of the two legs 30A and 30B of the plate 30 so that the screw is accessible through the slots 25 of two adjacent frame sections 12 at their mitred edges. The function of the corner piece is otherwise the same as in the prior art, i.e., when the screw 34 is tightened it pushes the plates 30 and 32 apart, causing the plates to engage opposing surfaces of the locking channel 18 and lock the frame sections 12 together. Because only a single screw is employed, and because it is symmetrically located, the likelihood of misalignment of the frame sections during tightening of the lock is substantially reduced.

Inasmuch as the corner piece in accordance with the invention uses only a single screw, a thicker backing plate 32 is required than in the case of the prior art corner pieces. For example, a 0.045 inches thick backing plate is commonly employed in a standard corner piece in which two screws are tightened to lock the frame sections. To provide a comparable effect, the thickness of the backing plate 32 in accordance with the invention should be increased to about 0.090 inches. Also, the surfaces of one or both plates 30 and 32 may be treated to enhance their attachment to the surfaces of the locking channel 18. For example, the edges of one or both plates may be burred to provide an upstanding edge which will be driven into a surface of the locking channel when the corner piece is tightened. The edges of the plates can be burred in conventional fashion, for example, by using a blade having a square edge to shear the edges of the plate during stamping. In addition, or alternatively, the surfaces of the plates which contact the locking channel may be cross hatched during the stamping process, or sand blasted to enhance the friction between the plates and the locking channel.

FIGS. 3–7 illustrate a corner piece in accordance with a second embodiment of the invention. In the second embodiment, the locking action of the corner piece is effected by a cam which forces the two plates of the corner piece apart.

In FIGS. 3–7, the corner piece comprises a locking plate 40 and a backing plate 42. The locking plate 40 includes an elongated slot 44 and laterally extending depressions 46 which function as bearing surfaces as described below. The slot 44 extends through the entire plate 40, but the lateral depressions 46 extend only part way through the plate.

The mechanism which is used to separate the plates 40 and 42 comprises a cam 48 which includes a short arm 48A, a long arm 48B, and a lateral cross piece 48C at the lower extremity of the short arm 48A. The arms 48A and 48B form an oblique angle. The cross piece 48C is generally elliptical in cross section, i.e. one dimension is larger than the other so that it can function as a cam when rotated. Obviously, other noncircular shapes will function as well. The cross piece 48C overlies the mitred junction between adjacent frame sections 12, and the lever 48 is accessible to the framer through one of the open slots in the back of the frame sections (FIG. 7). As in the embodiment of FIGS. 1 and 2, plates 40 and 42 may be held together by means of an elastomeric adhesive.

The corner piece is assembled by positioning the elliptical cross piece within the lateral depressions 46, with the cam arms 48A and 48B extending through slot 44. In the configuration shown in FIG. 5A, the short dimension of the elliptical cross piece 48C separates the plates 40 and 42, with the free end of the lever arm 48B easily accessible to the framer. In this configuration, separation of the plates 40 and 42 is minimal and the frame sections are unlocked.

To lock the adjacent frame sections (see FIG. 7), the frame sections are properly aligned and the cam arm 48B rotated down toward the locking plate 40. As the lever 48 rotates, the elliptical cross piece 48C urges the locking plate 40 away from the backing plate 42. When the lever 48 reaches the position shown in FIG. 5B, the plates 42 and 40 are separated by the large dimension of the elliptical cross piece 48C. In this position, the corner piece locks the adjacent frame sections 12.

The cam arms 48A and 48B are configured with respect to the elliptical cross piece 48C so that when the cross piece passes through its center position, the arm 48B will abut against the upper surface of the locking plate 40, thereby preventing further rotation of the cross piece which would tend to unlock the corner piece. In the illustrated embodiment, in the locked position, the cam arm 48B extends slightly outwardly from the back of the frame, which enhances its accessibility in the locked condition. If preferred, the arm 48B can be configured to fit within the slot 44 in the locked condition so that it is flush or close to flush with the back of the frame.

What is claimed is:

1. A picture frame, comprising mitred metallic frame sections, each frame section having a locking channel and a rearwardly facing opening, and a corner piece in each corner of the frame for locking adjacent frame sections together, each corner piece comprising an L-shaped tapped plate and an L-shaped backing plate, each plate including two joined legs and outer and inner surfaces, the legs of each plate extending into the locking channels of adjacent frame sections, each tapped plate having a single threaded aperture, and a screw extending through said aperture and adapted to engage the associated backing plate, said screw being accessible through the rearwardly facing opening of at least one frame section.

2. A picture frame according to claim 1, wherein said screw and threaded aperture are positioned at the junction of the legs of said L-shaped tapped plate, said screw being accessible through the rearwardly facing openings of two adjacent frame sections at their mitred edges.

3. A picture frame according to claim 2, wherein the outer surface of at least one of said plates is treated to enhance its holding power.

4. For use with a picture frame comprising mitred metallic frame sections, each frame section having a locking channel and a rearwardly facing opening, a corner piece for locking adjacent frame sections together, said corner piece comprising an L-shaped tapped plate and an L-shaped backing plate, each plate including two joined legs and outer and inner surfaces, the tapped plate having a single threaded aperture, and a screw extending through said aperture and adapted to engage the backing plate, said screw being accessible through the rearwardly facing opening of at least one frame section.

5. A corner piece according to claim 4, wherein said screw and threaded aperture are positioned at the junction of the legs of said L-shaped tapped plate, said screw being accessible through the rearwardly facing opening of two adjacent frame sections at their mitred edges.

6. A corner piece according to claim 5, wherein the surface of at least one of said plates is treated to enhance its holding power.

7. A picture frame, comprising mitred metallic frame sections, each frame section having a locking channel and a rearwardly facing opening, and a corner piece in each corner of the frame for locking adjacent frame sections together, each corner piece comprising a first L-shaped plate and an L-shaped backing plate, each plate including two joined legs and outer and inner surfaces, the legs of each plate extending into the locking channels of adjacent frame sections, each of said first plates supporting a single means for separating said plates so that said plates engage opposing surfaces of the locking channels of adjacent frame sections to thereby lock said frame sections together.

8. A picture frame according to claim 7, wherein said single means comprises a cam.

9. A picture frame according to claim 8, wherein said cam comprises an arm having a non-circular cross piece which engages said backing plate, whereby rotation of said arm causes said cross piece to force the backing plate away from the first plate.

10. A picture frame according to claim 9, wherein said first plate includes an elongated slot extending through the entire first plate and a cross slot extending partially through said first plate for receiving said cross piece for pivotable movement thereof.

11. A picture frame according to claim 10, wherein said arm includes first and second sections arranged at an angle less than 180°.

12. A picture frame according to claim 9, wherein said arm and cross piece are configured so that in moving from the unlocked to the locked position, the cross piece passes through an over center position causing it to tend to remain in its locked position.

13. For use with a picture frame comprising mitred metallic frame sections, wherein each frame section has a locking channel and a rearwardly facing opening, a corner piece for locking adjacent frame sections together, said corner piece comprising an L-shaped locking plate overlying an L-shaped backing plate, each plate including two joined legs and outer and inner surfaces, the legs of each plate adapted to extend into the locking channels of adjacent frame sections, and means located between said plates at the junctions of the legs of said plates for separating said plates so that said plates will engage opposing surfaces of the locking channels of adjacent frame sections to thereby lock said frame sections together.

14. A corner piece according to claim 13, wherein said means comprises a cam comprising an arm and a noncircular cross piece, said cross piece engaging said backing plate and said locking plate, whereby rotation of said arm causes said cross piece to force the locking plate away from the backing plate.

15. A corner piece according to claim 13, wherein said locking plate includes a slot extending through the entire plate and a cross slot extending partially through said plate for receiving said cross piece for pivotable movement thereof.

16. A corner piece according to claim 15, wherein said arm and cross piece are configured so that in moving from the unlocked to the locked position, the cross piece passes through an over center position.

* * * * *